(12) United States Patent
Lach

(10) Patent No.: US 8,356,447 B2
(45) Date of Patent: Jan. 22, 2013

(54) PORTABLE FLOOR COVERING

(75) Inventor: Christoph Lach, Vienna (AT)

(73) Assignee: Tuechler Buehnen- & Textiltechnik GmbH, Vienna (AD)

( * ) Notice: Subject to any disclaimer, the term of this patent is extended or adjusted under 35 U.S.C. 154(b) by 16 days.

(21) Appl. No.: 13/084,631

(22) Filed: Apr. 12, 2011

(65) Prior Publication Data

US 2012/0011791 A1   Jan. 19, 2012

(51) Int. Cl.
E04F 15/22 (2006.01)
E04F 15/00 (2006.01)

(52) U.S. Cl. ............. 52/177; 52/390; 52/391; 52/592.1; 52/309.8; 52/403.1

(58) Field of Classification Search ............ 52/177, 52/403.1, 588.1, 589.1, 590.1, 590.2, 590.3, 52/592.1, 591.2, 309.1, 309.3, 309.4, 309.5, 52/309.8, 309.13, 309.14, 309.15, 384, 385, 52/390–392, 575, 783.1, 782.1, 630, 144; 428/343, 354, 33, 50, 47, 55, 192
See application file for complete search history.

(56) References Cited

U.S. PATENT DOCUMENTS

| 4,635,425 | A | * | 1/1987 | Cova | 52/480 |
| 4,682,459 | A | * | 7/1987 | Stephenson | 52/390 |
| 6,189,283 | B1 | * | 2/2001 | Bentley et al. | 52/587.1 |
| 7,152,379 | B2 | * | 12/2006 | Lin et al. | 52/403.1 |
| 7,926,239 | B2 | * | 4/2011 | Hahn et al. | 52/592.1 |
| 8,006,460 | B2 | * | 8/2011 | Chen et al. | 52/592.1 |
| 2003/0131549 | A1 | * | 7/2003 | Kappeli et al. | 52/390 |
| 2007/0175137 | A1 | * | 8/2007 | Stone et al. | 52/295 |
| 2008/0104914 | A1 | * | 5/2008 | Lemieux | 52/403.1 |
| 2008/0295433 | A1 | * | 12/2008 | Eyal et al. | 52/403.1 |
| 2009/0183457 | A1 | * | 7/2009 | Boucke | 52/425 |

FOREIGN PATENT DOCUMENTS

WO   WO 2005/071165   *   8/2005

* cited by examiner

Primary Examiner — Brian Glessner
Assistant Examiner — Beth Stephan
(74) Attorney, Agent, or Firm — Andrew Wilford

(57) ABSTRACT

A portable floor panel has at least one absorption layer and at least one load-distributing layer laminated thereto and forming therewith a circumferential edge in turned formed with notches and teeth oriented such that notches and teeth of adjacent panels fit with one another.

16 Claims, 4 Drawing Sheets

PORTABLE FLOOR COVERING

FIELD OF THE INVENTION

The present invention relates to portable floor covering. More particularly this invention concerns a panel for making a portable dance floor.

BACKGROUND OF THE INVENTION

A typical portable floor system as is used as a dance floor is made of a plurality of interlocking panels each having at least one absorption layer and at least one load-distributing layer connected thereto. Such a system is used for ballet, dance, theater, acrobatics, circus or the like, to spare the joints of the actors. It must be possible to easily and rapidly assemble and disassemble the floors and they must be storable and transportable with low space requirements. Also, the weight per unit area and the storage volume should be low with respect to the transport.

Currently, there are floor coverings on the market that have very good shock-absorbing properties. In some cases, however, on the one hand, they can only be assembled and disassembled with considerable effort and, on the other, due to their thickness and weight, are difficult to store as well as difficult and costly to transport.

For this reason, portable floor panels are known from the prior art that always are based on a composite of an approximately 20 mm thick wooden or laminated board as load-distributing layer and plastic packs attached thereto that form the absorption layer. The connection of the individual floor panels takes place via a groove and tooth system or other interlocking formations.

Similar constructions are used for permanent installations. Floors constructed in such a manner are called area-elastic floors.

Another possibility to obtain a shock-absorbing floor is the use of materials that damp over the full surface such as foam mats with suitable upper floors that are in most cases PVC floors. With this construction, mixed elastic floors are achieved that, however, are always adhered to the subfloor and thus cannot be considered portable.

The problem is that for achieving a suitable mixed elastic floor, on the one hand, it is necessary to glue a plurality of layers with different stiffnesses and damping characteristics together, but, on the other, due to the desired low volume, a total thickness of approximately 1.5 centimeters is not to be exceeded. Such thin floor panels do not allow an integration of usual interlocking formations.

Moreover, the individual plies in case of permanent installations are usually processed only with weak adhesives because with a strong adhesive bond, a sandwich would be created that would destroy the shock absorbing properties.

OBJECTS OF THE INVENTION

It is therefore an object of the present invention to provide an improved portable floor covering.

Another object is the provision of such an improved portable floor covering that overcomes the above-given disadvantages, in particular that, while relatively thin, has the desired shock absorption and mixed elasticity, the plies being used being permanently elastically connected to each other and the interlocking formations allow a simple assembling and disassembling. Moreover, fire protection standards, for example, fire class Cfl-S1 or EN 13501 and certain force dissipation values and deformation values according to EN 14904 have to be met.

SUMMARY OF THE INVENTION

A portable floor panel has according to the invention at least one absorption layer and at least one load-distributing layer laminated thereto and forming therewith a circumferential edge in turn formed with notches and teeth oriented such that notches and teeth of adjacent panels fit with one another. Thus the object of the invention is in attained in that for detachably connecting the floor panels, circumferentially corresponding notches and connecting teeth are provided.

The notches and connecting teeth are jigsaw puzzle-shaped and allow rapidly assembling and disassembling the floor in virtually any form.

According to the invention the load-distributing layer of the floor panel can comprise at least two boards that are connected to each other. Furthermore, it can be advantageous if the absorption layer comprises a plurality of plies of damping material connected to each other. This way, an adaptation of the damping properties to the intended use can be achieved. The damping plies can be designed in particular as foam layers that have the same or different thickness, stiffness or damping characteristics.

For example, when used for dancing, it is often sufficient to achieve a force dissipation of 25% to 35% while for sports floors, a significantly higher elasticity is desired. The layered structure according to the invention allows such a selection of the achieved elasticity.

The boards can be designed as plywood boards or as multi-layered plywood boards (composite elements) glued and/or pressed together. For bonding the boards to each other and/or the absorption layer, in particular, a permanently elastic, silane-modified polymer adhesive can be used, whereby the above-described sandwich formation is avoided.

Moreover, the load-distributing layer can be coated with a top face of plastic, linoleum or the like. The total thickness of the panels can be adapted to the use and should typically be in the range of 1.5 cm.

The notches can be designed in particular as recesses that extend along the circumference of the floor panel and whose cross sections are trapezoids whose long bases are set inward toward the center of the floor panel. Corresponding to this, the connecting teeth are formed as webs that extend along the circumference of the floor panel and define trapezoids whose long bases are offset outward from the center of the floor panel. With this design of the connecting elements according to the invention, the connecting teeth engage seamlessly with the notches, so accurately fitting and gapless laying is ensured even though the small thickness of the elements does not allow the provision of conventional latching elements.

A further improvement of the fitting accuracy and durability of the connection of the floor panels can take place in that side notches and corner notches are provided, the side notches being on a side and the corner notches at a corner of the floor panel.

The side connecting teeth and corner connecting teeth are similarly oriented, with the side connecting teeth along a side and the corner connecting teeth at a corner of the floor panel. The corner connecting teeth fit seamlessly into the corner notches and thus allow a two-dimensional fixation in the corners that is not possible in case of conventional groove-tooth systems that are always implemented only along a side.

Nevertheless, this latching system allows a simple and rapid disassembly of the elements after the use without affecting the latching elements.

BRIEF DESCRIPTION OF THE DRAWING

The above and other objects, features, and advantages will become more readily apparent from the following description, reference being made to the accompanying drawing in which.

DETAILED DESCRIPTION

Figure 1:
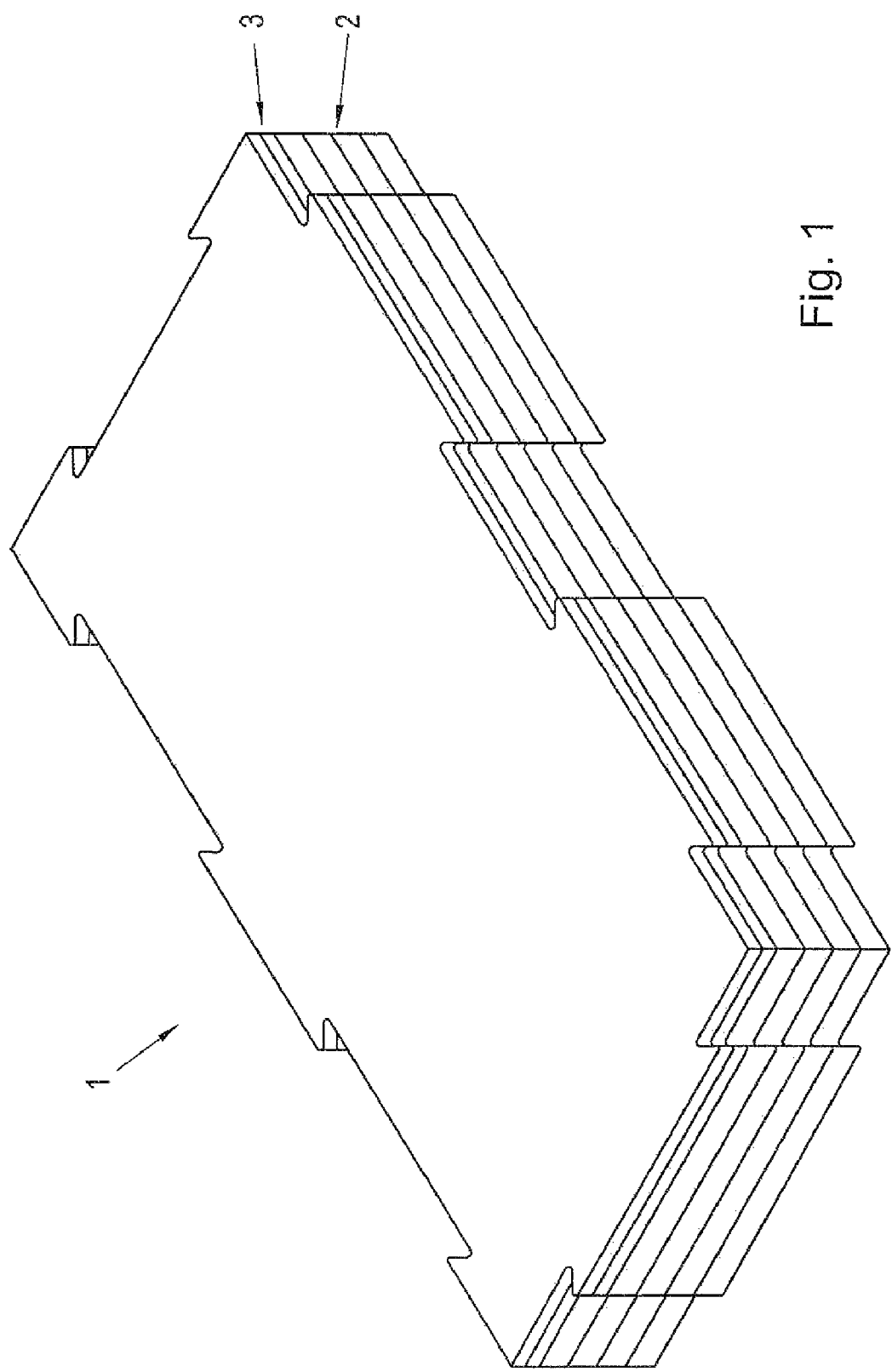
FIG. 1 is a perspective view of a floor panel according to the invention.

As seen in FIG. 1 a floor panel 1 has an absorption layer 2 consisting of a plurality of plies 5 and a load-distributing layer 3 also having multiple plies or boards 4. For a detachable connection, the floor panel 1 is circumferentially provided with keystone- or dovetail-shaped notches and keystone- or dovetail-shaped teeth fittable therewith and described in more detail with reference to FIG. 4.

Figure 2:
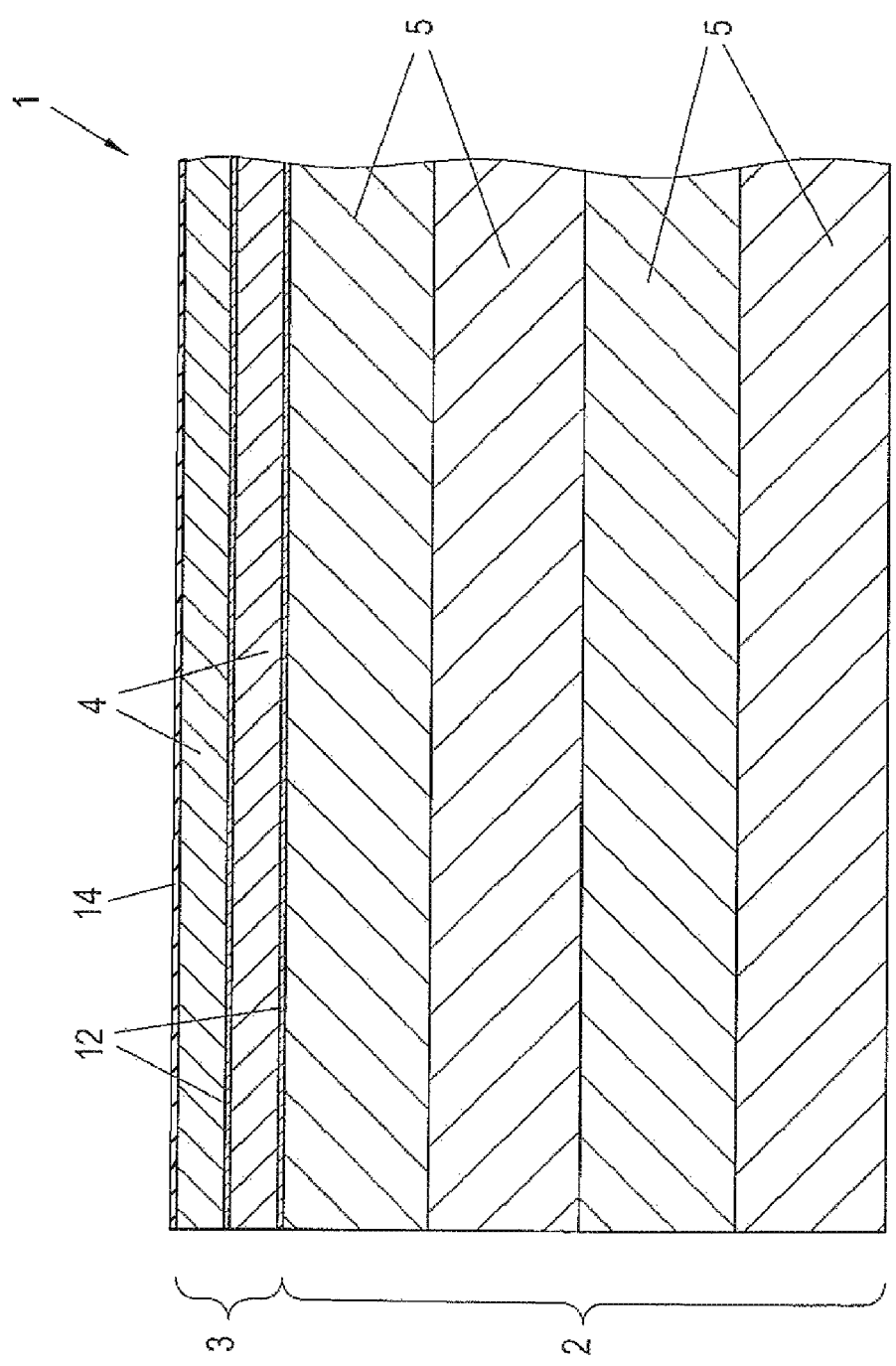
FIG. 2 is a vertical section through a detail of the floor panel of this invention.

Aa shown in FIG. 2 the load-distributing layer 3 is formed of a plurality of the damping plies 5 that are laminated together, for example, adhered to each other. The damping plies 5 are preferably foam plies that, in particular, can have different thickness, stiffness and damping characteristics to be adapted to the special requirements.

The load-distributing layer 3 here comprises the two plies or boards 4 that are laminated together. The boards 4 can be of composite construction, for example multilayer plywood sheets that are glued to each other. However, also according to the invention the boards 4 can be of plastic or other hard wear-resistant materials. The boards 4 are adhered to each other or and to the load-distributing layer 2 with an adhesive 12 or are connected in a different manner. Here, the adhesion is carried out using a permanently elastic, silane-modified polymer adhesive. According to the invention a further layer 14 can be applied to the load-distributing layer 3 serving as top surface for the floor. This can involve, for example, a plastic, linoleum or other top surface that is suitable for such use.

Figure 3:
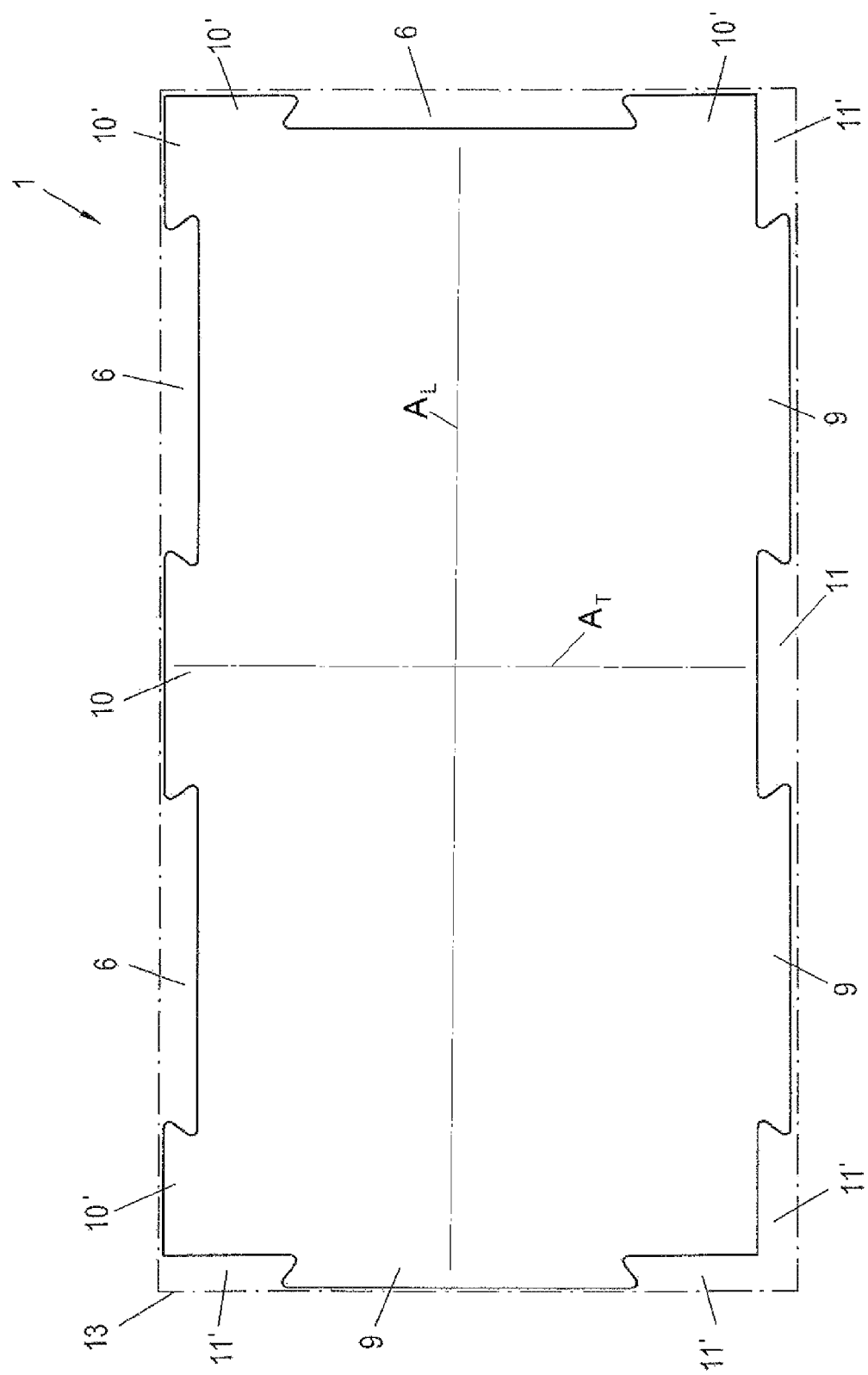
FIG. 3 is a top view of the panel.

FIG. 3 shows in a top view of the floor panel 1 the design of the connecting means that are suitable to connect the floor panels 1 to each other in a detachable manner so that from a plurality of floor panels 1, a large area can be provided with a floor, in particular dance floor or sports floor.

Figure 4:
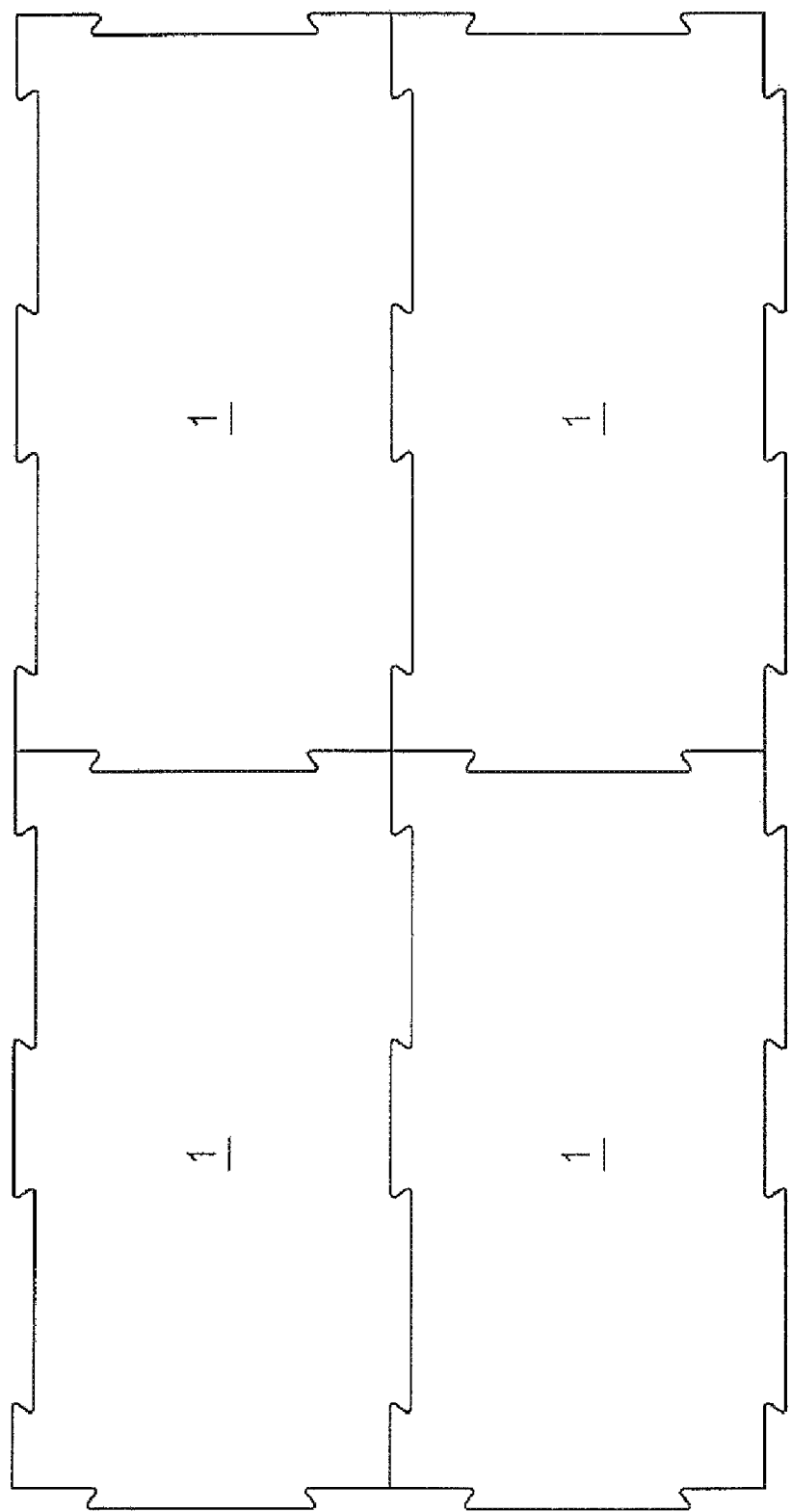
FIG. 4 is a top view showing four of the panels locked together.

Each panel 1 is basically rectangular, in fact being cut from a rectangular blank of 2:1 proportions whose outline is shown at 13, and is of a shape symmetrical to a longitudinal center axis $A_L$ and to a transverse center axis $A_T$. The straight outer edges of the panel are formed with notches 6, 11, and 11' and teeth 9, 10, and 10'. More particularly, one long side of each panel 1 (up in FIG. 3) has two identical trapezoidal or keystone-shaped notches 6 separated by a short tooth 10 and flanked by two teeth 10' each half the width of the center tooth 10, and the opposite long edge is formed with a central notch 11 complementary to the tooth 10 and flanked by two of the full-width teeth 9 complementary to the notches 6 and themselves flanked by two notches 11' each half the width of the center notch 11. One short end edge (to the left in FIG. 3) has a central full-width tooth 9 of the same size as the notches 6 flanked by two half-width notches 11', and the opposite short end edge has a central full-width notch 6 flanked by two half-width teeth 10'. Thus it is possible for the panels to fit together with their long and short edges aligned as shown in FIG. 4 and, theoretically, it is also possible to stagger the panels 1 with every other row having its short end edges in the middle of the flanking rows. The notches and teeth fit together, but the teeth 10 and notches 11 are only about ⅔ as long as the teeth 9 and notches 6.

The special shaping of the connecting elements ensures a precise fit without clearance, a high connection rigidity and an easy detachability of the connection, if required. The notches 6, 11, and 11' are formed as circumferential, defined trapezoids, the longer side of which faces the center of the floor panel 1, while the connecting teeth are formed by the remaining webs that, accordingly, form trapezoids, the longer side of which face away from the center of the floor panel 1. The notches and connecting teeth are designed complementary and thus allow an accurately fitting assembly of the individual elements.

An example of a floor installed by means of the floor panels according to the invention is shown in FIG. 4.

Of course, the invention is not limited by the described embodiments and also includes in particular other floor panels that are not rectangular. For example, it can be advantageous for the respective field of use to provide square or hexagonal floor panels without departing from the context of the present invention. The invention comprises further the floor panel itself as well as the floor system formed by assembling a plurality of floor panels according to the invention and the floor generated in this manner that is designed in particular as dancing, sports or gymnastics floor.

I claim:

1. A portable floor panel comprising:
   at least one absorption layer formed of a plurality of connected foam damping plies that each have a damping characteristic different from that of an adjacent foam damping ply;
   at least one load-distributing layer laminated to the absorption layer and forming therewith an outer edge formed with notches and teeth oriented such that notches and teeth of adjacent panels are configured to fit with one another; and
   a permanently elastic, silane-modified polymer adhesive between and bonding together the absorption layer and the load-distributing layer.

2. The floor panel defined in claim 1 wherein the load-distributing layer comprises at least two boards that are connected to each other.

3. The floor panel defined in claim 1 wherein each of the damping plies also has a thickness or stiffness characteristic that is different from the thickness or stiffness characteristic of an adjacent damping ply.

4. The floor panel defined in claim 2 wherein the boards are of plywood.

5. The floor panel defined in claim 4 wherein the plywood boards have glued-together layers.

6. The floor panel defined in claim 1 wherein the floor panel is area-elastic, point-elastic or mixed elastic.

7. The floor panel defined in claim 1, further comprising an uppermost layer of plastic.

8. The floor panel defined in claim 1 wherein the layers are made of materials that meet the fire class Cfl-S1 or the standard EN 13501.

9. The floor panel defined in claim 1 wherein the panels have a force dissipation according to EN 14904 of more than 25%.

10. The floor panel defined in claim 1 wherein the panel has a deformation according to EN 14904 of 1.1 mm to 1.5 mm.

11. The floor panel defined in claim 1 wherein the notches are of trapezoidal shape with bases extending parallel to and offset inward from the respective panel edge.

12. The floor panel defined in claim 11 wherein some of the notches extend to corners of the panel.

13. The floor panel defined in claim 12 wherein the teeth are of trapezoidal shape with bases extending parallel to and offset outward from the respective panel edge.

14. The floor panel defined in claim 13 wherein some of the teeth extend to corners of the panel.

15. The floor panel defined in claim 1 wherein the panel has an overall thickness of 1 to 3 cm.

16. The floor panel defined in claim 15 wherein the thickness is substantially 1.5 cm.

\* \* \* \* \*